Feb. 10, 1925.
F. C. BROWN
1,525,604
BRAKE EQUALIZER
Filed March 13, 1924    2 Sheets-Sheet 1
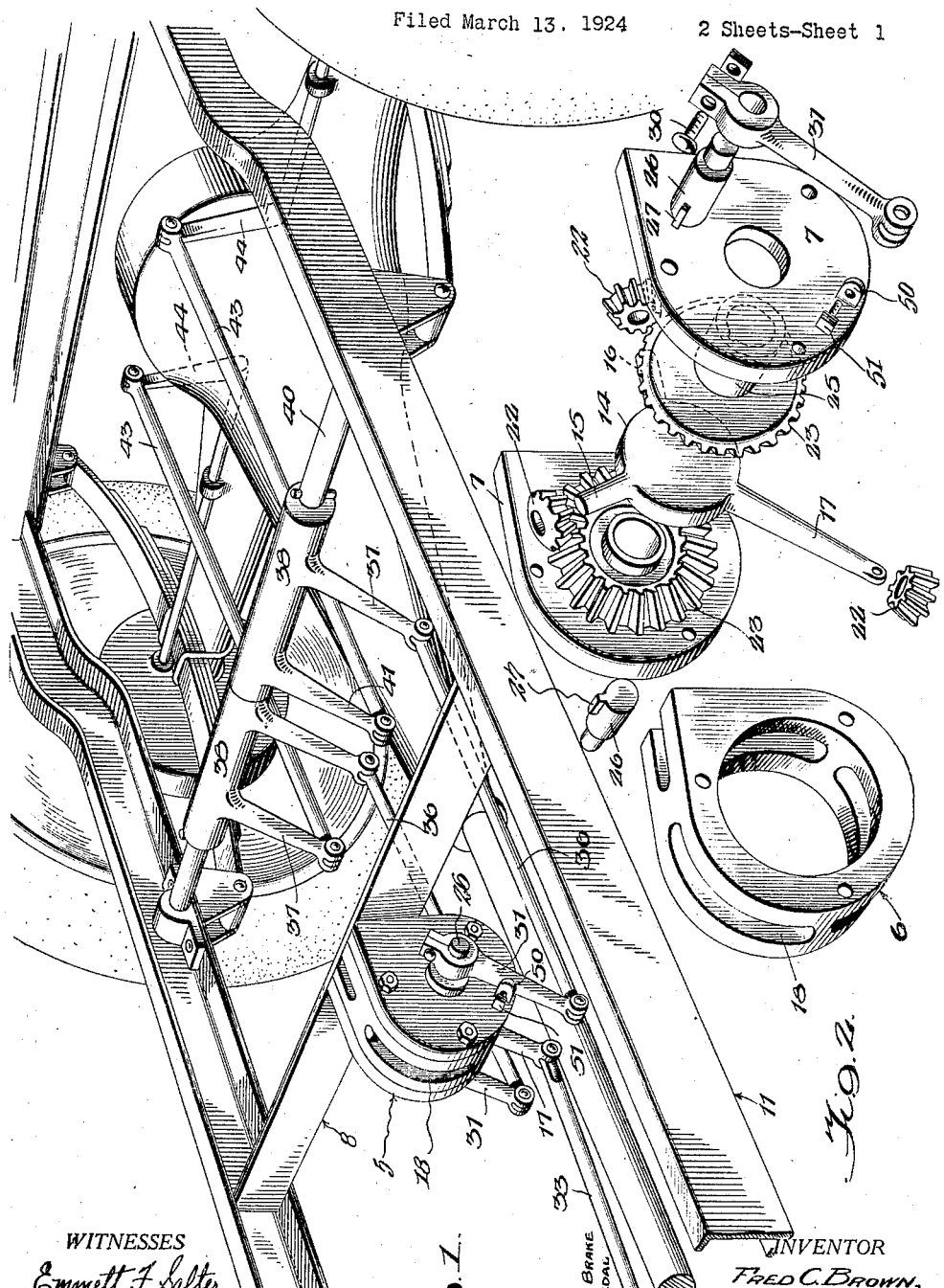

Feb. 10, 1925.   1,525,604
F. C. BROWN
BRAKE EQUALIZER
Filed March 13, 1924   2 Sheets-Sheet 2

WITNESSES
Emmett F. Salter

INVENTOR
FRED C. BROWN,
BY Milo B. Stevens Co.
ATTORNEYS

Patented Feb. 10, 1925.

1,525,604

UNITED STATES PATENT OFFICE.

FRED C. BROWN, OF EVERGREEN PARK, ILLINOIS.

BRAKE EQUALIZER.

Application filed March 13, 1924. Serial No. 699,061.

*To all whom it may concern:*

Be it known that I, FRED C. BROWN, a citizen of the United States, residing at Evergreen Park, in the county of Cook and State of Illinois, have invented new and useful Improvements in Brake Equalizers, of which the following is a specification.

This invention relates to brake equalizers especially adapted for use on automobiles.

An important aim of this invention is to provide a brake equalizer which will bring about the uniform application of all of the brakes on the motor vehicle to prevent skidding and to prevent unnecessary and excessive wear on any of the tires.

A further object is to provide a brake equalizer embodying a differential which may be installed at any convenient or desirable point on the automobile without interfering with the operation of the vehicle or the braking means for the same.

A further object is to provide a brake equalizer which requires practically no attention and in which the parts are so constructed that wear and friction is reduced to a minimum.

Also an important aim of this invention is to provide a brake equalizer which is of highly simplified construction, durable in use and comparatively cheap to manufacture.

Other objects and advantages will be apparent during the course of the following description.

In the accompanying drawings forming a part of this application and in which like numerals are employed to designate like parts throughout the same, Figure 1 is a perspective of the improved brake equalizer applied;

Fig. 2 is a group perspective of the improved brake equalizer detached;

Fig. 3 is a vertical sectional view through the improved equalizer applied;

Figure 4:
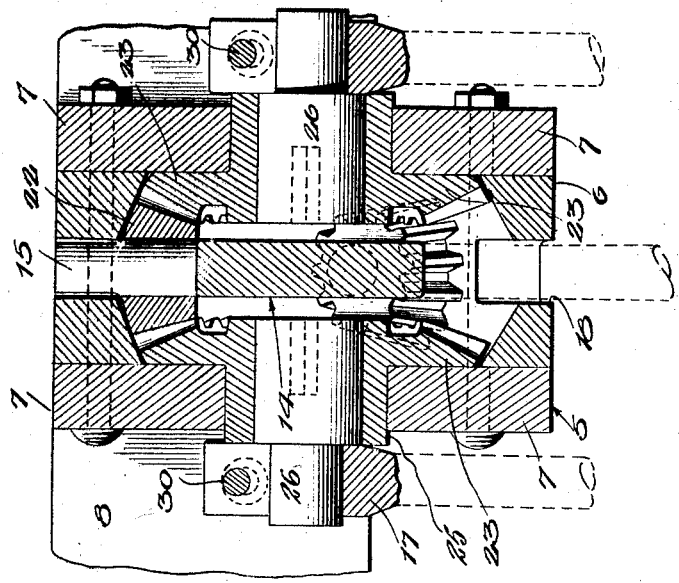
Fig. 4 is a vertical transverse sectional view taken on line 4—4 of Fig. 3.
Figure 5:
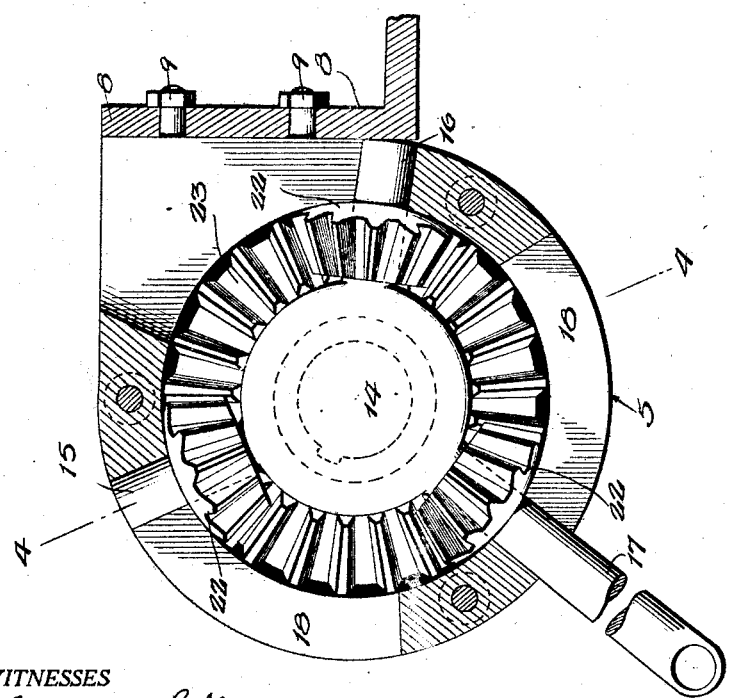

In the drawings wherein for the purpose of illustration is shown a preferred embodiment of the invention, the numeral 5 generally designates a housing or casing consisting of a central annulus 6 and a pair of similarly constructed side walls 7. As illustrated in Figs. 1 and 3 one edge of the casing may be flattened and secured in engagement with a cross bar 8 by means of fastening devices 9 of any suitable type. It is thus seen that the improved brake equalizer may be mounted at a point approximately midway between ends of the chassis 11 so that the same is in position to be operated by one of the driver control brake operating members, either a hand lever or foot pedal or possibly both.

The improved brake equalizer is provided with a spider 14 having a plurality of radial arms designated by the numerals 15, 16 and 17, the said arms being extended through arcuate slots 18 in the annulus 6. The end walls of the slots 18 might be said to constitute stops to limit the turning of the spider 14 as the end walls of the slots are directly in the path of travel of and are engaged by the radial arms 15, 16 and 17.

Figs. 2 and 3 plainly illustrate the pinions 22 which are rotatable on the arms 15, 16 and 17 and are adapted to mesh with beveled gears 23. The beveled gears 23 are formed with hubs 25 rotatably extended through the end walls 7 and having driving connection with short shafts 26 through the medium of keys 27 or similar driving means.

The shafts 26 are secured within the hubs 25 and have their outer portions extended beyond the hubs and connected by suitable fastening devices 30 to separately actuated cranks 31.

In carrying out the invention the arm 17 is extended a substantial distance beyond the casing and has its end provided with means whereby the same may be connected to a link 33 extended from a suitable point of control. More specifically the link 33 may be connected to a foot pedal or a hand lever. Attention is especially directed to the fact that the arm 17 not only provides a support for one of the pinions 22, but also provides a means whereby the operating link 33 may be directly connected to the spider so as to turn the spider in the desired direction.

The operation of the spider 14 causes the beveled gear 23 of the least resistance to be turned and this of course results in the operation of that crank 31 associated therewith.

The several cranks 31 which are as previously stated more or less separately actuated have connection with rearwardly extending links 36, which are in turn connected to cranks 37 of separate sleeves 38.

Fig. 1 illustrates that the sleeves 38 of which there may be two are rotatably mounted on a cross shaft 40 and are provided with radial cranks 41 connected to rearwardly projecting links 43 of the brake operating mechanism 44. Fig. 1 plainly shows that the brake operation members 44 have connection with the brakes of the rear wheels so that when a longitudinal movement in the proper direction is imparted to the link 33 the brakes will be applied. The improved equalizer might also be employed in connection with four wheel brakes.

In the operation of improved brake equalizer the longitudinal movement of the link 33 in the proper direction results in the turning of one or both of the cranks and in this manner the brakes are evenly applied to prevent the skidding or sliding of the tires. When a proper amount of pressure has been applied to one wheel by the brake, the braking force is applied to the other wheel so that the pressure is equalized. More specifically the braking force is uniformly distributed to each of the brake equipped wheels.

Fig. 1 plainly illustrates that the housing 5 of the improved brake equalizer may be provided with laterally projecting ears 50 having set screws 51 arranged in the path of travel of the cranks 31 so as to limit the movement of the cranks. However movement of the cranks beyond a vertical position is seldom necessary as by the differential action of the equalizer the uniform application of the brakes brings the vehicle to a gradual and certain stop.

It is to be understood that the form of the invention herewith shown and described is to be taken as a preferred example of the same and that such minor changes in arrangement and construction of parts may be made as will remain within the spirit of the invention and scope of what is claimed.

Having thus described the invention, what is claimed is:

1. A brake equalizer comprising a casing having a plurality of slots, a spider arranged within the housing and having radial arms positioned in said slots, pinions mounted on said arms and beveled gears engaged by said pinions.

2. A brake equalizer comprising a casing having spaced slots, a spider arranged in the casing and having radial arms positioned in said slots, pinions mounted on said arms, and beveled gears arranged within said casing and engaged by said pinions.

3. A brake equalizer comprising a casing having spaced slots, a spider arranged in the casing and having radial arms positioned in said slots, pinions mounted on said arms, and beveled gears arranged within said casing and engaged by said pinions, one of said arms of the spider extended a substantial distance beyond the casing and having means whereby the same may be connected directly to an operating member, and cranks having connection with said beveled gears.

4. A brake equalizer comprising a casing consisting of an annulus and side walls connected to the annulus, said annulus being formed with spaced slots, a spider arranged within the annulus and having radial arms, a pinion rotatable on each arm, beveled gears engaged by each pinion, cranks having connection with said beveled gears, one of said arms of the spider being extended for a substantial distance beyond the casing and having means whereby the terminal portion of the same may be connected to an operating member whereby the operating member is connected directly to the spider for turning the pinions on the beveled gears.

5. A brake equalizer comprising a casing consisting of an annulus and side walls connected to the annulus, said annulus being formed with spaced slots, a spider arranged within the annulus and having radial arms, a pinion rotatable on each arm, beveled gears engaged by each pinion, cranks having connection with said beveled gears, one of said arms of the spider being extended for a substantial distance beyond the casing, having means whereby the terminal portion of the same may be connected to an operating member whereby the operating member is connected directly to the spider for turning the pinions on the beveled gears and means to limit the turning of the beveled gears.

6. A brake equalizer for motor vehicle brakes comprising a casing consisting of an annulus and a pair of side walls, said annulus being formed with slots, a spider having radial arms positioned in said slots, pinions mounted on said arms, beveled gears mounted in said casing and engaged by said pinions, said beveled gears being provided with hubs rotatably extended through said side walls of the casing, shafts secured in said hubs, cranks connected to said shafts, one of said arms of the spider being extended for a substantial distance beyond the casing and having its terminal portion formed with means whereby an operating member may be connected thereto whereby the operating member is connected directly to the spider, and adjustable means arranged in the path of travel of said cranks to limit the turning of the same.

In testimony whereof I affix my signature.

FRED C. BROWN.